US012731868B2

(12) United States Patent
Wang et al.

(10) Patent No.: US 12,731,868 B2
(45) Date of Patent: Sep. 8, 2026

(54) ADHESIVE TAPE FOR ELECTRODE TAB AND USE THEREOF, ATTACHMENT METHOD, SECONDARY BATTERY, BATTERY MODULE, BATTERY PACK, AND A POWERED DEVICE

(71) Applicant: CONTEMPORARY AMPEREX TECHNOLOGY CO., LIMITED, Ningde (CN)

(72) Inventors: Long Wang, Ningde (CN); Huihui Liu, Ningde (CN); Siying Huang, Ningde (CN); Yaohui Wang, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 265 days.

(21) Appl. No.: 18/430,656

(22) Filed: Feb. 2, 2024

(65) Prior Publication Data

US 2025/0007120 A1 Jan. 2, 2025

Related U.S. Application Data

(63) Continuation of application No. PCT/CN2022/089219, filed on Apr. 26, 2022.

(51) Int. Cl.
*H01M 50/536* (2021.01)

(52) U.S. Cl.
CPC ................................ *H01M 50/536* (2021.01)

(58) Field of Classification Search
CPC .... C09J 7/30; C09J 2301/312; C09J 2301/18; C09J 5/00; C09J 2203/33; H01M 50/595
See application file for complete search history.

(56) References Cited

U.S. PATENT DOCUMENTS 5,264,264 A 11/1993 Shibata et al.

FOREIGN PATENT DOCUMENTS

| | | |
|---|---|---|
| CN | 205846076 U | 12/2016 |
| CN | 109407415 A | 3/2019 |
| CN | 109536067 A | 3/2019 |
| CN | 209568040 U | * 11/2019 |
| CN | 213652352 U | 7/2021 |
| JP | 2005235414 A | * 9/2005 |

(Continued)

OTHER PUBLICATIONS

WO 2018180748 A1 translation (Year: 2018).*

(Continued)

*Primary Examiner* — Jeffrey T Barton
(74) *Attorney, Agent, or Firm* — K&L Gates LLP

(57) ABSTRACT

Disclosed is an adhesive tape for an electrode tab, which includes a base-material layer and an adhesive layer. The adhesive layer includes a thick region and a thin region which extend from a side edge of the adhesive tape in a width direction of the adhesive layer, the thick region is distributed along the side edge of the adhesive tape, and an adhesive layer thickness of the thick region is greater than an adhesive layer thickness of the thin region. A ratio of an area of the thin region to an area of the thick region is 1:0.02-0.25, optionally 1:0.025-0.18, and further optionally 1:0.0275-0.125. The adhesive tape covers an edge of the tab to fundamentally prevent contact between the tab and a battery cell body.

13 Claims, 3 Drawing Sheets

(56) References Cited

FOREIGN PATENT DOCUMENTS

| | | | | | |
|---|---|---|---|---|---|
| JP | 2009295500 | A | | 12/2009 | |
| JP | 2010205467 | A | * | 9/2010 | .............. H01M 4/06 |
| JP | 2013041822 | A | | 2/2013 | |
| JP | 2018181853 | A | | 11/2018 | |
| KR | 20130124053 | A | | 11/2013 | |
| WO | WO-2018180748 | A1 | * | 10/2018 | .......... H01M 10/052 |
| WO | WO-2018216114 | A1 | * | 11/2018 | ............ C09J 133/04 |
| WO | 2020/258860 | A1 | | 12/2020 | |
| WO | WO-2021199484 | A1 | * | 10/2021 | ........ H01M 10/0587 |
| WO | 2020174810 | A1 | | 12/2021 | |

OTHER PUBLICATIONS

Translation of JP-2005235414-A (Year: 2005).*
Translation of CN-209568040-U (Year: 2019).*
Translation of WO-2018216114-A1 (Year: 2018).*
Translation of JP-2010205467-A (Year: 2010).*
Translation of WO-2021199484-A1 (Year: 2021).*
“Poly(Ethylene-Co-Acrylic Acid),” Chemical Book. (Year: 2026).*
“Polypropylene,” Chemical Book. (Year: 2026).*
The Decision to Grant a Patent received in the counterpart JP Application No. 2024-510492, dated Oct. 21, 2025, 4 pages with English translation.
The Notice of Reasons for Refusal received in the counterpart JP Application 2024-510492, dated Apr. 8, 2025, 5 pages with English translation.
The extended European search report received in the corresponding European Application 22938732.9, mailed on Jul. 24, 2024.
Office Action (with English Machine Translation), mailed Jul. 15, 2025, for corresponding Japanese Patent Application Serial No. 2024-510492.
International Search Report received in the corresponding International Application PCT/CN2022/089219, mailed Jan. 18, 2023.
Written Opinion of ISA received in the corresponding International Application PCT/CN2022/089219, mailed Jan. 18, 2023.
Office Action (with English Machine Translation), mailed Mar. 3, 2026, for corresponding Korean Patent Application Serial No. 10-2024-7006077.

* cited by examiner

ADHESIVE TAPE FOR ELECTRODE TAB AND USE THEREOF, ATTACHMENT METHOD, SECONDARY BATTERY, BATTERY MODULE, BATTERY PACK, AND A POWERED DEVICE

CROSS REFERENCE TO RELATED APPLICATION

The present application is a continuation of International Patent Application No. PCT/CN2022/089219, filed on Apr. 26, 2022, the contents of which are incorporated herein by reference.

TECHNICAL FIELD

The present disclosure relates to the technical field of lithium batteries, and in particular, to an adhesive tape for an electrode tab and use thereof, an attachment method, a secondary battery, a battery module, a battery pack, and a powered device.

BACKGROUND

In recent years, with the increasing application range of secondary batteries, lithium-ion batteries are widely used in energy storage power supply systems such as waterpower systems, firepower systems, wind power systems and solar power stations, and fields such as electric tools, electric bicycles, electric motorcycles, electric vehicles, military equipment, and aerospace. Due to great development of the secondary battery, higher requirements are demanded for its energy density, cycle performance, safety performance, etc. The secondary battery includes a positive electrode and a negative electrode, and tabs are metal conductors that lead the positive and negative electrodes out from a battery cell. Generally speaking, the tabs are ears of the positive and negative electrodes of the battery, which are contact points of the positive and negative electrodes during charging and discharging.

However, in charging and discharging processes of the battery, the tab may be in contact with a battery cell body, and there is a safety risk of short-circuit of the battery cell. In the related art, an insulating layer is usually applied to a tab region of an electrode sheet. After the tab is bent, the insulating layer can isolate a tab body from the battery cell body to prevent the tab from being in direct contact with the battery cell body, so as to make it unlikely to short-circuit for an interior of the battery cell. However, an end face of the tab is not protected by the insulating layer, such that after the tab is bent, the end face of the tab will be in contact with the battery cell body, to result in the short-circuit of the battery cell. Therefore, the method for insulating the tab in the related art still needs to be improved.

SUMMARY

In view of the above problem, the present disclosure provides an adhesive tape for an electrode tab, which has a specific adhesive layer structure. The adhesive tape covers an edge of the tab to fundamentally prevent contact between the tab and a battery cell body, and it can be satisfied that a top cover does not interfere when a battery cell is placed in a housing, thereby improving safety performance of a secondary battery.

In order to achieve the above aims, a first aspect of the present disclosure provides an adhesive tape for an electrode tab, which includes a base-material layer and an adhesive layer. The adhesive layer includes a thick region and a thin region which extend from a side edge of the adhesive tape in a width direction of the adhesive layer, the thick region is distributed along the side edge of the adhesive tape, and an adhesive layer thickness of the thick region is greater than an adhesive layer thickness of the thin region. A ratio of an area of the thin region to an area of the thick region is 1:0.02-0.25, optionally 1:0.025-0.18, and further optionally 1:0.0275-0.125.

Not being limited to any theory, it is found by the applicant that the adhesive tape having the thick region adhesive layer with the above area ratio has a strong bonding capability and wraps tightly around the electrode tab. This can fundamentally prevent contact between the tab and the battery cell body, and the top cover does not interfere when the battery cell enters the housing, thereby improving the safety performance of the secondary battery.

In an embodiment, in the width direction of the adhesive layer, a width of the thick region is 1% to 20% of a width of the adhesive tape. An area of the thick region is 1% to 20% of a surface area of the adhesive tape, optionally 2% to 15%, and further optionally 2.5% to 12%. An area of the thin region is 80% to 99% of the surface area of the adhesive tape, optionally 85% to 98%, and further optionally 88% to 97.5%. Therefore, the adhesive tape is more firmly bonded to the tab, thereby improving the safety performance of the secondary battery.

In an embodiment, the adhesive layer thickness of the thick region is 7 microns to 15 microns. The adhesive layer thickness of the thin region is 15% to 40% of the adhesive layer thickness of the thick region, and the width of the adhesive tape is 2 mm to 14 mm. Therefore, the adhesive tape is more firmly bonded to the tab, thereby improving the safety performance of the secondary battery.

In an embodiment, the adhesive tape is formed with through holes, the through holes are distributed in rows along a center line of the adhesive tape with a row spacing of 5 mm to 15 mm, and the through holes each have an aperture of 100 μm to 1000 μm. Therefore, the through hole can reduce the tensile strength of the adhesive tape, and it can be satisfied that the top cover does not interfere when the battery cell enters the housing, thereby improving the safety performance of the secondary battery.

In an embodiment, an adhesive strength of the adhesive tape is equal to or greater than 2 N/m. Therefore, the adhesive tape is more firmly bonded to the tab, thereby improving the safety performance of the secondary battery.

In an embodiment, an average deviation of the adhesive layer thickness of the thick region, extending from the side edge of the adhesive tape in the width direction, does not exceed 10%, optionally not exceeding 8%, and further optionally not exceeding 5%. Therefore, the adhesive tape is more firmly bonded to the tab, thereby improving the safety performance of the secondary battery.

In an embodiment, the thick region extending from the side edge of the adhesive tape in the width direction has discontinuous protrusions distributed in a dotted pattern. Therefore, the adhesive tape is more firmly bonded to the tab, thereby improving the safety performance of the secondary battery.

In an embodiment, a color of the adhesive tape includes, but is not limited to, yellow, brown, green, blue, and white. Therefore, the adhesive tape can identify the positive and negative electron tabs, which facilitates subsequent operations.

A second aspect of the present disclosure further provides use of the adhesive tape of the first aspect of the present disclosure for attaching to a tab of an electrode sheet of a secondary battery. Therefore, the adhesive tape wraps around the edge of the tab, so that the contact between the tab and the battery cell body is fundamentally prevented, and it is satisfied that the top cover does not interfere when the battery cell enters the housing, thereby improving the safety performance of the secondary battery.

A third aspect of the present disclosure further provides a method of attaching the adhesive tape of the first aspect of the present disclosure to a tab of an electrode sheet of a secondary battery. The method includes: providing an electrode sheet having a tab; and attaching the adhesive tape of the first aspect of the present disclosure on two sides of the tab in such a manner that the thick region of the adhesive tape is attached to the electrode sheet, the thin region covers an end face of the tab, and adhesive portions of the adhesive tape on the two sides of the tab are attached to each other.

Therefore, the adhesive tape and the tab can be tightly combined to prevent the contact between the tab and the battery cell body, and it can be satisfied that the top cover does not interfere when the battery cell enters the housing, thereby improving the safety performance of the secondary battery.

A fourth aspect of the present disclosure further provides a secondary battery, which includes a positive electrode sheet or a negative electrode sheet that is attached with the adhesive tape of the first aspect of the present disclosure.

The third aspect of the present disclosure provides a secondary battery, which includes a positive electrode active material of the first aspect of the present disclosure or a positive electrode active material prepared according to the method of the second aspect of the present disclosure.

A fourth aspect of the present disclosure provides a battery module including the secondary battery of the third aspect of the present disclosure.

A fifth aspect of the present disclosure provides a battery pack including the battery module of the fourth aspect of the present disclosure.

A sixth aspect of the present disclosure provides a powered device, which includes at least one of the secondary battery of the third aspect of the present disclosure, the battery module of the fourth aspect of the present disclosure, or the battery pack of the fifth aspect of the present disclosure.

The adhesive tape of the present disclosure has a specific adhesive layer structure, and the adhesive tape covers the edge of the tab to fundamentally prevent contact between the tab and the battery cell body, and it can be satisfied that the top cover does not interfere when the battery cell enters the housing, thereby improving the safety performance of the secondary battery. Further, the adhesive tape has specific through holes, which can reduce the tensile strength of the adhesive tape, and it can be further satisfied that the top cover does not interfere when the battery cell enters the housing.

Figure 1:
FIG. 1 is a schematic diagram of a secondary battery according to an embodiment of the present disclosure.
Figure 1:
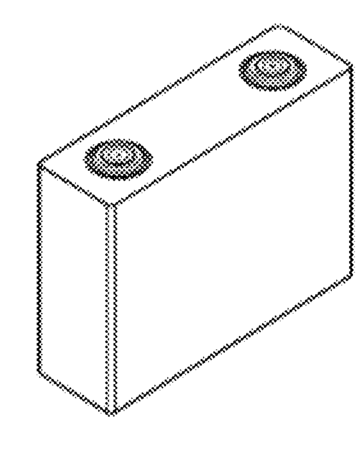

Reference signs:

1 battery pack; 2 upper box body; 3 lower box body; 4 battery module; 5 secondary battery; 51 housing; 52 electrode assembly; 53 top cover assembly.

DESCRIPTION OF EMBODIMENTS

Embodiments of an adhesive tape for a tab and use thereof, an attachment method, a secondary battery, a battery module, a battery pack, and a powered device of the present disclosure are described in detail below with reference to the accompanying drawings. However, unnecessary detailed description may be omitted. For example, a detailed description of well-known items and a repeated description of an actually same structure are omitted. This is to avoid unnecessarily lengthy of the following description, thereby making it convenient for those skilled in the art to understand. In addition, the accompany drawings and the following description are provided to make those skilled in the art to fully understand the present disclosure, which is not intended to limit the subject matter recited in the claims thereto.

A "range" disclosed herein is defined in a form of a lower limit and an upper limit, and a given range is defined by selecting a lower limit and an upper limit, while the selected lower limit and upper limit define a boundary of a particular range. The range defined in this manner may include or do not include an end value and may be arbitrarily combined, that is, any lower limit may be combined with any upper limit to form a range. For example, if ranges of 60 to 120 and 80 to 110 are listed for a particular parameter, it is understood that ranges of 60 to 110 and 80 to 120 are also expected. Further, if minimum range values 1 and 2 are listed and maximum range values 3, 4, and 5 are listed, ranges of 1 to 3, 1 to 4, 1 to 5, 2 to 3, 2 to 4, and 2 to 5 may all be expected. In the present disclosure, unless otherwise stated, a numerical range "a to b" means an abbreviated representation of a combination of any real numbers between a to b, where a and b are both real numbers. For example, a numerical range "0 to 5" means that all real numbers between "0 and 5" are all listed herein, and "0 to 5" is merely an abbreviated representation of combinations of these numbers. In addition, when it is expressed that a certain parameter is an integer which is ≥2, it is equivalent to disclosing that the parameter is, for example, an integer 2, 3, 4, 5, 6, 7, 8, 9, 10, 11, 12, or the like.

If not specifically stated, all embodiments and optional embodiments of the present disclosure may be combined with each other to form a new technical solution.

If not specifically stated, all technical features and optional technical features of the present disclosure may be combined with each other to form a new technical solution.

If not specifically stated, all steps of the present disclosure may be performed sequentially or may be performed randomly, preferably sequentially. For example, the method includes steps (a) and (b), indicating that the method may include steps (a) and (b) performed sequentially or may include steps (b) and (a) performed sequentially. For example, the method may further include a step (c), indicating that the step (c) may be added to the method in any order, for example, the method may include steps (a), (b), and (c), or it may include steps (a), (c), and (b), or it may include steps (c), (a), and (b).

If not specifically stated, "include and "comprise" mentioned in the present disclosure represent an open type or may be a closed type. For example, the "include" and "comprise" may indicate that other un-listed components can be further included or comprised, or only listed components are included or comprised.

If not specifically stated, a term "or" is inclusive in the present disclosure. For example, a phrase "A or B" means "A, B, or both A and B". More specifically, the condition "A or B" is satisfied by either of the following conditions: A is true (or present) and B is false (or not present); A is false (or not present) and B is true (or present); or both A and B are true (or present).

A secondary battery includes a positive electrode and a negative electrode, and tabs are metal conductors that lead the positive electrode and the negative electrode out from a battery cell. Generally speaking, the tabs are ears of the positive electrode and the negative electrode of the battery, which are contact points of the positive electrode and the negative electrode during charging and discharging. However, in charging and discharging processes of the battery, the tab may be in contact with a battery cell body, and there is a safety risk of short-circuit of the battery cell. In the related art, an insulating layer is usually applied to a tab area of an electrode sheet. After the tab is bent, the insulating layer can isolate a tab body from the battery cell body to prevent the tab from being in direct contact with the battery cell body, so as to make it unlikely to short-circuit for an interior of the battery cell. However, an end face of the tab is not protected by the insulating layer, such that after the tab is bent, the end face of the tab will be in contact with the battery cell body, to result in the short-circuit of the battery cell. Therefore, the method for insulating the tab in the related art still needs to be improved. In view of the above problem, the present disclosure aims to provide an adhesive tape for an electrode tab, which has a specific adhesive layer structure. The adhesive tape wraps around an edge of the tab to fundamentally prevent contact between the tab and the battery cell body, and it can be satisfied that a top cover does not interfere when a battery cell enters a housing, thereby improving the safety performance of the secondary battery.

Adhesive Tape for Battery Tab

In an embodiment of the present disclosure, the present disclosure provides an adhesive tape for an electrode tab, which includes a base-material layer and an adhesive layer. In the adhesive layer, there are a thick region and a thin region which extend in a width direction from a side edge of the adhesive tape, and the thick region is distributed along the side edge of the adhesive tape. A thickness of an adhesive layer of the thick region is greater than a thickness of an adhesive layer of the thin region. A ratio of an area of the thin region to an area of the thick region is 1:0.02-0.25, optionally 1:0.025-0.18, and further optionally 1:0.0275-0.125.

Although an mechanism is not clear yet, the applicant accidentally found that by using the adhesive tape of the present disclosure and setting therefor an adhesive layer containing a thick region of a specific proportion, the adhesive tape is used to wrap an edge of the tab to fundamentally prevent contact between the tab and a battery cell body, and it can be satisfied that a top cover does not interfere when the battery cell enters a housing, thereby improving the safety performance of the secondary battery.

In some embodiments, in a width direction of the adhesive layer, a width of the thick region is 1-20%, which is calculated based on a width of the adhesive tape. When calculating based on a surface area of the adhesive tape, a ratio of the area of the thick region to the area of the adhesive layer is 1-20%, optionally 2-15%, and further optionally 2.5-12%. A ratio of the area of the thin region to the area of the adhesive layer is 80-99%, optionally 85-98%, and further optionally 88-97.5%. Therefore, the adhesive tape is more firmly bonded to the tab, thereby improving the safety performance of the secondary battery.

In some embodiments, an adhesive layer thickness of the thick region is 7-15 microns, an adhesive layer thickness of the thin region is 15-40% of the adhesive layer thickness of the thick region, and the width of the adhesive tape is 2-14 mm. Therefore, the adhesive tape is more firmly bonded to the tab, thereby improving the safety performance of the secondary battery.

In some embodiments, the width of the adhesive tape is 2-14 mm, the width of the thick region is 1-2 mm, and the thickness of the thick region is 7-15 um. When calculating based on the surface area of the adhesive tape, the ratio of the area of the thick region to the area of the adhesive layer is 1-20%. The width of the thin region is 0-13 mm, and the thickness thereof is 1-5 um.

In some embodiments, the adhesive tape is formed with through holes, the through holes are distributed in rows along a center line of the adhesive tape, with a row spacing of 5-15 mm and an aperture of 100 μm-1000 μm. Therefore, the through holes can reduce tensile strength of the adhesive tape, and it can be satisfied that the top cover does not interfere when the battery cell enters the housing, thereby improving the safety performance of the secondary battery.

In some embodiments, an adhesive strength of the adhesive tape is equal to or greater than 2 N/m. Thus, the adhesive tape is more firmly bonded to the tab, thereby improving the safety performance of the secondary battery.

In some embodiments, a bonding strength of the adhesive tape is 2 N/m-100 N/m, and the tensile strength thereof is 1 MPa-150 MPa.

In some embodiments, as extending from the side edge of the adhesive tape in the width direction, an average deviation of the thickness of the thick region does not exceed 10%, optionally not exceeding 8%, and further optionally not exceeding 5%. Therefore, the adhesive tape is more firmly bonded to the tab, thereby improving the safety performance of the secondary battery.

In some embodiments, as extending from the side edge of the adhesive tape in the width direction, the thick region has discontinuous protrusions distributed in a dotted pattern. Therefore, the adhesive tape is more firmly bonded to the tab, thereby improving the safety performance of the secondary battery.

In some embodiments, a material used for the adhesive layer of the adhesive tape is generally well known to those skilled in the art. For example, the material used as the adhesive layer of the adhesive tape can be selected from one or more of acrylic acid-methacrylic acid copolymer, acrylic acid-butenoic acid copolymer, acrylic acid-itaconic acid copolymer, acrylic acid-maleic acid copolymer, acrylic acid-methyl methacrylate copolymer, acrylic acid-ethyl methacrylate copolymer, acrylic acid-n-butyl methacrylate copolymer, acrylic-methacrylic acid isobutyl ester copolymer, polypropylene, polyethylene, polybutadiene rubber, ethylene-propylene acetate copolymer, ethylene-propylene copolymer, ethylene-vinyl acetate copolymer, maleic anhydride modified polyolefin, poly(butadiene-acrylonitrile), styrene-maleic anhydride copolymer and the like, preferably ethylene-propylene copolymer. The above material is usually mixed with toluene to prepare glue for use.

In some embodiments, the materials used for the base-material layer of the adhesive tape is generally well known to those skilled in the art. For example, the material used for the base-material layer of the adhesive tape may be selected from PET (polyethylene terephthalate), PE (polyethylene), PP (polypropylene), PI (polyimide), and BOPP (biaxially oriented polypropylene film), preferably PET.

In some embodiments, after a side of the base-material layer is coated with an adhesive layer, a release agent can be coated on the other side thereof, so that the adhesive tape cannot be adhered together when winding and unwinding. The release agent may be selected from one or more of an organosilicon release agent, a fluorine-containing release agent, and a non-silicon release agent, and the release agent of the adhesive tape is selected from the non-silicon release agent.

In some embodiments, a surface of the base-material layer is coated with a release agent to form a release film, and the adhesive layer is then coated on a surface of another side of the base-material layer. The release film is usually a PET release film, a PP release film, a PE release film, or the like, and can be selected as a PET release film.

In some embodiments, a color of the adhesive tape includes, but not limited to, yellow, brown, green, blue, and white. Therefore, the adhesive tape identifies the positive and negative electrode tabs, which facilitates subsequent operations.

In some embodiments, the adhesive tape is prepared by methods known to those skilled in the art. Generally, the glue made from the material of the adhesive layer is coated on the release film and dried in an oven, and is then wound with the release film to obtain the adhesive tape. The coating may be performed in any form of micro-concave, comma, and slit. By controlling parameters of the coating, such as a pump speed, an adhesive layer having a thick region and a thin region is coated. Optionally, the base-material layer is firstly coated with the adhesive layer on a side thereof, and then the base material is coated with the release agent on the other side thereof. After that, the base-material layer is placed in the oven to be dried and then wound. The coating manner of the release agent is the same as that of the adhesive layer.

In some embodiments, in the winding process, the release film is torn off at the same time, and finally adhesive tapes with different widths are obtained by cutting. In this way, the release film can be recycled, thereby saving resources and reducing costs.

A second aspect of the present disclosure further provides use of the adhesive tape of the first aspect of the present disclosure for attaching to a tab of an electrode sheet of a secondary battery. Therefore, the adhesive tape covers an edge of the tab to fundamentally prevent contact between the tab and a battery cell body, and it can be satisfied that a top cover does not interfere when the battery cell enters a housing, thereby improving the safety performance of the secondary battery.

A third aspect of the present disclosure further provides a method for applying an adhesive tape to a tab of an electrode sheet of a secondary battery with the adhesive tape of the first aspect of the present disclosure. The method includes steps:

providing an electrode sheet having a tab;

applying the adhesive tape in the first aspect of the present disclosure to both sides of the tab, such that a thick region of the adhesive tape is attached to the electrode sheet, a thin region of the adhesive tape covers an end surface of the tab, and adhesive portions of the adhesive tape on both sides of the tab are attached together.

Therefore, the adhesive tape and the tab can be tightly bonded to prevent contact between the tab and the battery cell body, and it can be satisfied that the top cover does not interfere when the battery cell enters the housing, thereby improving the safety performance of the secondary battery.

A fourth aspect of the present disclosure further provides a secondary battery, which includes a positive electrode sheet or a negative electrode sheet attached on the adhesive tape according to the first aspect of the present disclosure.

A secondary battery, a battery module, a battery pack and a powered device of the present disclosure are described below with reference to the accompanying drawings.

In an embodiment of the present disclosure, a secondary battery is provided.

Generally, the secondary battery includes a positive electrode sheet, a negative electrode sheet, electrolyte, and an isolation film. In the charging and discharging processes of the battery, active ions are embedded and disengaged back and forth between the positive electrode sheet and the negative electrode sheet. The electrolyte acts as conductive ions between the positive electrode sheet and the negative electrode sheet. The isolation film is disposed between the positive electrode sheet and the negative electrode sheet, mainly preventing short-circuit of the positive and negative electrodes and allowing the ions to pass through.

[Positive Electrode Sheet]

The positive electrode sheet includes a positive electrode current collector and a positive electrode film layer provided on at least one surface of the positive electrode current collector, and the positive electrode film layer includes the positive electrode active material of the first aspect of the present disclosure.

In some embodiments, the adhesive tape of the first aspect of the present disclosure is attached at the tab of the positive electrode sheet.

As an example, the positive electrode current collector has two surfaces opposite to each other in a thickness direction thereof, and the positive electrode film layer is disposed on any one or both of the two opposite surfaces of the positive electrode current collector.

In some embodiments, the positive electrode current collector may be a metal foil or a composite current collector. For example, the metal foil is an aluminum foil. The composite current collector may include a macromolecular material base-layer and a metal layer formed on at least one surface of the macromolecular material base-layer. The composite current collector may be formed by forming a metal material (such as, aluminum, aluminum alloy, nickel, nickel alloy, titanium, titanium alloy, silver, and silver alloy) on a macromolecular base material (such as, polypropylene (PP), polyethylene terephthalate (PET), polybutylene terephthalate (PBT), polystyrene (PS), and polyethylene (PE)).

In some embodiments, the positive electrode active material is a positive electrode active material for a battery known in the art. As an example, the positive electrode active material includes at least one of lithium-containing phosphate of an olivine structure, lithium transition metal oxide, or respective modified compounds thereof. However, the present disclosure is not limited to these materials, and other traditional materials that may be used as positive electrode active materials of the battery may be used. These positive electrode active materials may be used alone or in combinations of two or more. Examples of the lithium transition metal oxide may include, but are not limited to, at least one of lithium cobalt oxide (e.g., $LiCoO_2$), lithium nickel oxide (e.g., $LiNiO_2$), lithium manganese oxide (e.g., $LiMnO_2$, $LiMn_2O_4$), lithium nickel cobalt oxide, lithium manganese cobalt oxide, lithium nickel manganese oxide, lithium nickel cobalt manganese oxide (e.g., $LiNi_{1/3}Co_{1/3}Mn_{1/3}O_2$, which may be referred to as $NCM_{333}$), $LiNi_{0.5}Co_{0.2}Mn_{0.3}O_2$ (which may be referred to as $NCM_{523}$), $LiNi_{0.5}Co_{0.25}Mn_{0.25}O_2$ (which may be referred to as $NCM_{211}$), $LiNi_{0.6}Co_{0.2}Mn_{0.2}O_2$ (which may be referred to as $NCM_{622}$), $LiNi_{0.8}Co_{0.1}Mn_{0.1}O_2$ (which may be referred to as $NCM_{811}$), lithium nickel cobalt aluminum oxide (e.g., $LiNi_{0.85}Co_{0.15}Al_{0.05}O_2$), or modified compound thereof. Examples of the lithium-containing phosphate of olivine structure may include, but are not limited to, at least one of lithium iron phosphate (such as $LiFePO_4$, which may be referred to as LFP), a composite material of lithium iron phosphate and carbon, lithium manganese phosphate (such as $LiMnPO_4$), a composite material of lithium manganese phosphate and carbon, lithium iron manganese phosphate, or a composite material of lithium iron manganese phosphate and carbon.

In some embodiments, the positive electrode film layer further optionally includes a binding agent. As an example, the binding agent may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, or fluorine-containing acrylate resin.

In some embodiments, the positive electrode film layer further optionally includes a conductive agent. As an example, the conductive agent may include at least one of superconducting carbon, acetylene black, carbon black, Ketjen black, carbon dots, carbon nanotubes, graphene, or carbon nanofibers.

In some embodiments, the positive electrode sheet is prepared as follows. The above components for preparing the positive electrode sheet, such as the positive electrode active material, the conductive agent, the binding agent and any other components, are dispersed in a solvent (e.g., N-methylpyrrolidone) to form positive electrode slurry. The positive electrode slurry is then coated on the positive electrode current collector, and the positive electrode sheet is obtained after drying, cold pressing and other processes.

[Negative Electrode Sheet]

The negative electrode sheet includes a negative electrode current collector and a negative electrode film layer disposed on at least one surface of the negative electrode current collector, and the negative electrode film layer includes a negative electrode active material.

In some embodiments, the adhesive tape of the first aspect of the present disclosure is attached to the tab of the positive electrode sheet.

As an example, the negative electrode current collector has two surfaces opposite to each other in a thickness direction thereof, and the negative electrode film layer is disposed on any one or both of the two opposite surfaces of the negative electrode current collector.

In some embodiments, the negative electrode current collector may be a metal foil or a composite current collector. For example, the metal foil is a copper foil. The composite current collector may include a macromolecular material base-layer and a metal layer formed on at least one surface of the macromolecular material base-material. The composite current collector may be formed by forming a metal material (such as, copper, copper alloy, nickel, nickel alloy, titanium, titanium alloy, silver, and silver alloy) on a macromolecular base material (such as, polypropylene (PP), polyethylene terephthalate (PET), polybutylene terephthalate (PBT), polystyrene (PS), and polyethylene (PE)).

In some embodiments, the negative electrode active material may be a negative electrode active material for a battery known in the art. As an example, the negative electrode active material may include at least one of artificial graphite, natural graphite, soft carbon, hard carbon, silicon-based material, tin-based material, or lithium titanate. The silicon-based material may be selected from one or more of elemental silicon, silicon-oxygen compound, silicon-carbon composite, silicon-nitrogen compound, and silicon alloy. The tin-based material may be selected from one or more of elemental tin, tin oxide compound, and tin alloy. However, the present disclosure is not limited to these materials, and other traditional materials that may be used as the negative electrode active materials of the battery may be used. These negative electrode active materials may be used alone or in combinations of two or more.

In some embodiments, the negative electrode film layer further optionally includes a binding agent. The binding agent may be selected from one or more of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally includes a conductive agent. The conductive agent may be selected from one or more of superconducting carbon, acetylene black, carbon black, Ketjen black, carbon dots, carbon nanotubes, graphene, and carbon nanofibers.

In some embodiments, the negative electrode film layer may optionally include other additives, such as a thickening agent, e.g., sodium carboxymethyl cellulose (CMC-Na).

In some embodiments, the negative electrode sheet is prepared as follows. The above components for preparing the negative electrode sheet, such as the negative electrode active material, the conductive agent, the binding agent and any other components, are dispersed in a solvent (for example, deionized water) to form negative electrode slurry. The negative electrode slurry is then coated on the negative electrode current collector, and the negative electrode sheet is obtained after drying, cold pressing and other processes.

[Electrolyte]

The electrolyte acts as conductive ions between the positive electrode sheet and the negative electrode sheet. The present disclosure has no specific limitation on the type of the electrolyte, which can be selected according to requirements. For example, the electrolyte may be in a liquid state, a gel state, or an all-solid state.

In some embodiments, the electrolyte is electrolytic solution. The electrolytic solution includes electrolyte salt and a solvent.

In some embodiments, the electrolyte salt may be selected from one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis (fluorosulfonyl) imide (LiFSI), lithium bis(trifluoromethanesulfonyl)imide (LiTFSI), lithium trifluoromethanesulfonate (LiTFS), lithium difluoro (oxalato) borate (LiDFOB), lithium bis(oxalate) borate (LiBOB), lithium difluorophosphate ($LiPO_2F_2$), lithium difluorobisoxalato phosphate (LiDFOP), and lithium tetrafluorooxalate phosphate (LiTFOP).

In some embodiments, the solvent may be selected from one or more of fluoroethylene carbonate (FEC), ethylene carbonate (EC), propylene carbonate (PC), methyl ethyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetramethylene sulfone (SF), dimethyl sulfone (MSM), methyl ethyl sulfone (EMS), and diethyl sulfone (ESE).

In some embodiments, the electrolytic solution further optionally includes an additive. For example, the additive may include a negative electrode film-forming additive and a positive electrode film-forming additive, and may further include additives capable of improving performance of the battery, such as additives for improving overcharge performance of the battery and additives for improving high-temperature or low-temperature performance of the battery.

[Isolation Film]

In some embodiments, the secondary battery further includes an isolation film. The type of the isolation film is not particularly limited in the present disclosure, and may be any well-known isolation film with a porous structure that has good chemical stability and mechanical stability.

In some embodiments, a material of the isolation film may be selected from at least one of glass fiber, non-woven fabric, polyethylene, polypropylene, and polyvinylidene fluoride. The isolation film may be a single-layer film or may be a multilayer composite film, which is not particularly limited. When the isolation film is a multilayer composite film, materials of the layers may be the same or different, which is not particularly limited.

In some embodiments, the positive electrode sheet, the negative electrode sheet and the isolation film is made into an electrode assembly by means of a winding process or a lamination process.

In some embodiments, the secondary battery may include an outer package. The outer package is configured to package the above electrode assembly and the electrolyte.

In some embodiments, the outer package of the secondary battery may be a hard housing, such as a hard plastic housing, an aluminum housing, and a steel housing. The outer package of the secondary battery may be a soft package, such as a bag-type soft package. A material of the soft package may be plastic, such as polypropylene, polybutylene terephthalate, and polybutylene succinate.

The shape of the secondary battery is not particularly limited in the present disclosure, and may be cylindrical, square, or any other shape. For example, FIG. 1 illustrates a secondary battery 5 having a square structure as an example.

Figure 2:
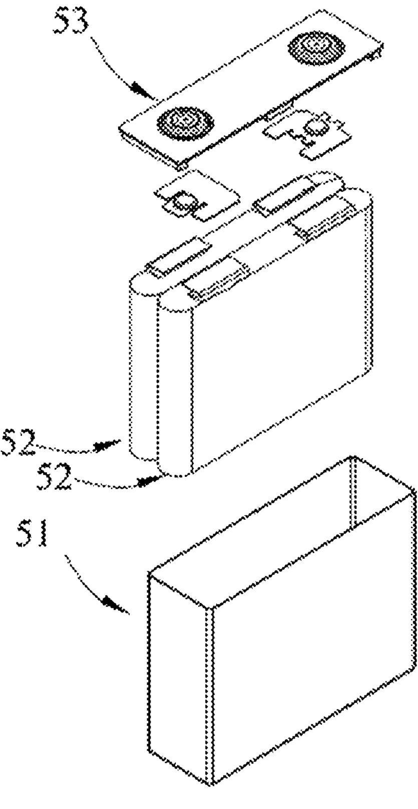
FIG. 2 is an exploded view of a secondary battery according to the embodiment of the present disclosure shown in FIG. 1.

In some embodiments, referring to FIG. 2, the outer package includes a housing 51 and a cover plate 53. The housing 51 includes a bottom plate and a side plate connected to the bottom plate, and the bottom plate and the side plate enclose an accommodating cavity. The housing 51 has an opening in communication with the accommodating cavity, and the cover plate 53 can cover the opening to enclose the accommodating cavity. The positive electrode sheet, the negative electrode sheet and the isolation film forms an electrode assembly 52 through a winding process or a lamination process. The electrode assembly 52 is enclosed in the accommodating cavity. The electrolyte is immersed in the electrode assembly 52. The secondary battery 5 may include one or more electrode assemblies 52, and those skilled in the art can select according to specific actual requirements.

In some embodiments, the secondary battery may be assembled into a battery module, and the battery module may include one or more secondary batteries, the specific number of which can be selected by those skilled in the art according to the application and a capacity of the battery module.

Figure 3:
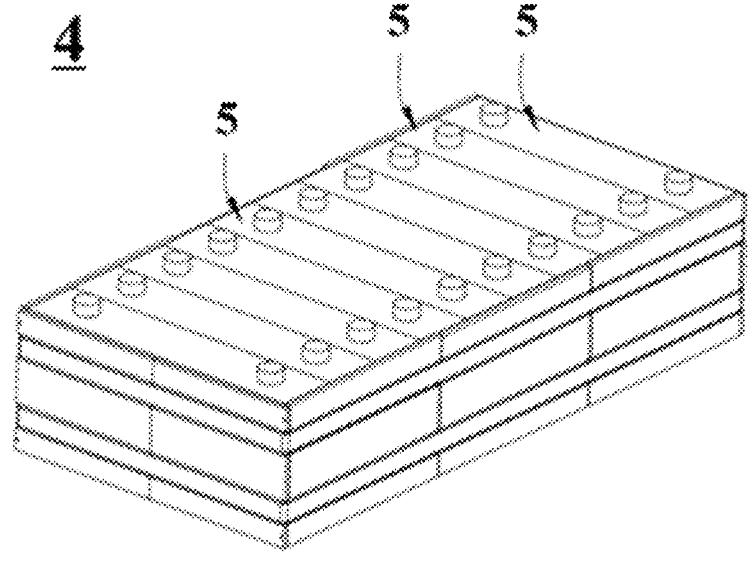
FIG. 3 is a schematic diagram of a battery module according to an embodiment of the present disclosure.

FIG. 3 illustrates a battery module 4 as an example. Referring to FIG. 3, a plurality of secondary batteries 5 of the battery module 4 is sequentially arranged along a length direction of the battery module 4. Alternatively, the secondary batteries may be arranged in any other manner. The plurality of secondary batteries 5 can be further fixed by fasteners.

Optionally, the battery module 4 may further include an outer shell having an accommodating space, and the plurality of secondary batteries 5 is accommodated in the accommodating space.

In some embodiments, the above battery modules may be assembled into a battery pack, and the number of the battery modules contained in the battery pack may be one or more, specific number of which can be selected by those skilled in the art according to the application and capacity of the battery pack.

Figure 4:
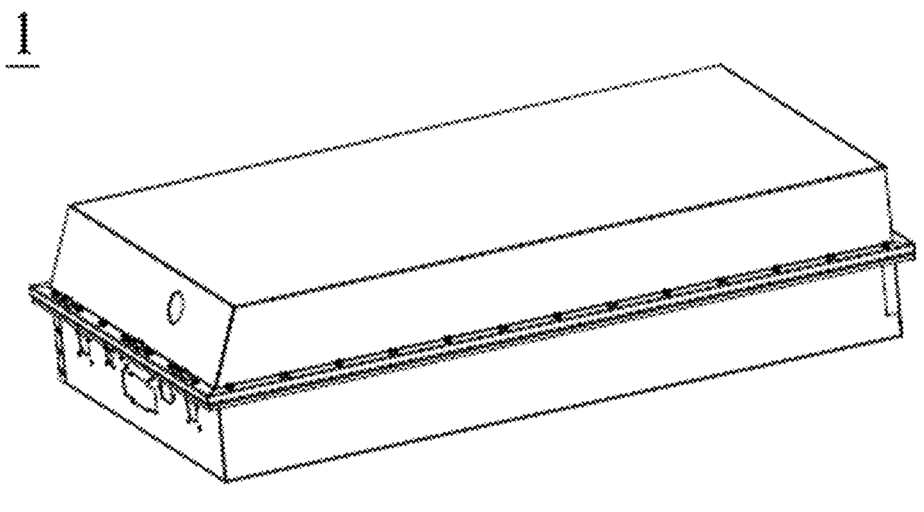
FIG. 4 is a schematic diagram of a battery pack according to an embodiment of the present disclosure.
Figure 5:
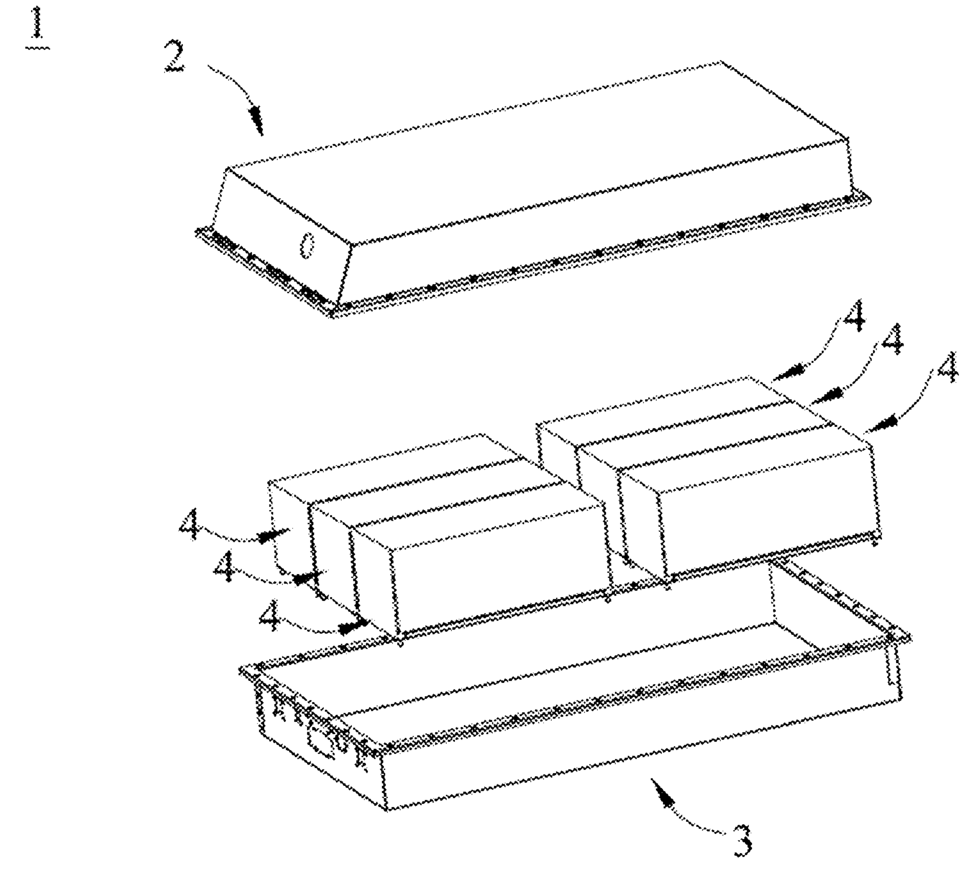
FIG. 5 is an exploded view of a battery pack according to the embodiment of the present disclosure shown in FIG. 4.

FIG. 4 and FIG. 5 show a battery pack 1 as an example. Referring to FIG. 4 and FIG. 5, the battery pack 1 includes a battery box and a plurality of battery modules 4 provided in the battery box. The battery box includes an upper box body 2 and a lower box body 3, and the upper box body 2 can cover the lower box body 3 to form a closed space for accommodating the battery module 4. The plurality of battery modules 4 may be arranged in the battery box in any manner.

In addition, the present disclosure further provides a powered device, and the powered device includes at least one of the secondary battery, the battery module, or the battery pack according to the present disclosure. The secondary battery, the battery module or the battery pack may be used as a power supply for the powered device, or may be used as an energy storage unit of the powered device. The powered device may include a mobile device (such as a mobile phone and a notebook computer), an electric vehicle (such as a pure electric vehicle, a hybrid electric vehicle, a plug-in hybrid electric vehicle, an electric bicycle, an electric scooter, an electric golf cart, and an electric truck), an electrical train, a ship, a satellite, an energy storage system and the like, but it is not limited thereto.

The powered device may selecte the secondary battery, the battery module, or the battery pack according to use requirements thereof.

Figure 6:
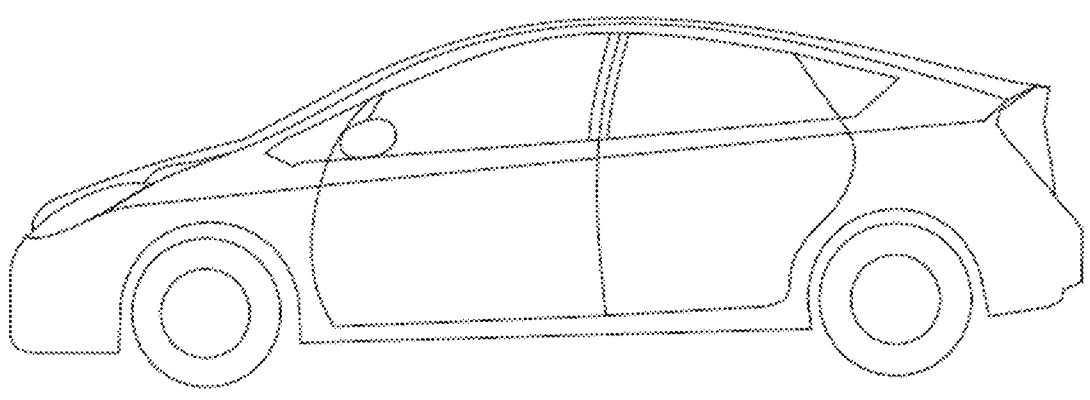
FIG. 6 is a schematic diagram of a powered device using a secondary battery as a power supply according to an embodiment of the present disclosure.

FIG. 6 illustrates a powered device as an example. The powered device is a pure electric vehicle, a hybrid electric vehicle, a plug-in hybrid electric vehicle and the like. In order to meet requirements of the powered device for high power and high energy density of the secondary battery, a battery pack or a battery module can be adopted.

As another example, a device may be a mobile phone, a tablet computer, a notebook computer and the like. The device is usually required to be light and thin, and the secondary battery can be used as a power supply.

EMBODIMENTS

In order to make the technical problems to be solved, the technical solutions and the beneficial effects clearer, the present disclosure will be further described in detail below in combination with embodiments and the drawings. It is apparent that the described embodiments are only a part of the embodiments of the present disclosure, rather than all embodiments. The following description of at least one exemplary embodiment is merely illustrative, and is not intended as limitation on the present disclosure and its application. Based on the embodiments of the present disclosure, all other embodiments obtained by those skilled in the art without creative efforts shall fall within the scope of the present disclosure.

Specific techniques or conditions, which are not specified in the embodiments, are carried out in accordance with techniques or conditions described in literature in the art or in accordance with a specification of a product. The reagents or instruments used without any indication of manufacturers are conventional products available commercially.

Test Method

A) Adhesive Strength of Adhesive Tape

The adhesive strength of the adhesive tape is tested with reference to GB/T 2792-2014 standard.

Specifically, an aluminum foil is attached to a steel plate, and the adhesive tape is then attached onto the aluminum foil. A peeling force is tested by 180 degrees, and a value of the peeling force is defined as the adhesive strength of the adhesive tape. It is noted that a width of the aluminum foil is greater than that of the adhesive tape.

stainless steel reactor, and is stirred at 40° C. for 3 hours to obtain glue. The prepared glue is then coated on a PET release film with a width of 14 mm by using a slit coating machine, and a pump speed on a side of the slit coating machine is set at 14 rpm to obtain a thick region with a width of 2 mm and a thickness of 6±1.5 um. A pump speed on another side of the slit coating machine is set at 20 rpm to obtain a thin region with a width of 12 mm and a thickness of 1.5+1 μm. The adhesive tape is then placed in a drying oven to be dried for 15 min, and then rolled to obtain the adhesive tape.

The adhesive tape is formed to have a thick region with the width of 2 mm and the thickness of 6 μm and a thin region with the width of 12 mm and the thickness of 1.5 um. An area ratio of the thick region is 14.2%, which is calculated based on a surface area of the adhesive tape. The adhesive strength of the adhesive layer is 9 N/m, and the tensile strength thereof is 10 MPa.

Preparation methods of adhesive tapes of Embodiments 1.2-14 and an adhesive tape of Comparative Example 1.1 are similar to that of the adhesive tape in Embodiment 1, but parameters of thick regions of the adhesive tapes and parameters of holes of the adhesive tapes are adjusted. Different product parameters are listed in Table 1.

TABLE 1

Related parameters and properties of the adhesive tapes of various Embodiments and the Comparative Examples

| Serial Number of Embodiments | Thick Region Width mm | Thick Region Thickness um | Thin Region Thickness um | Width of Adhesive Tape mm | Hole Size um | Hole Row Spacing mm | Area Ratio of Thick Region % | Adhesive Strength N/m | Tensile Strength Mpa |
|---|---|---|---|---|---|---|---|---|---|
| Comparative Example 1.1 | 14 | 8 | 0 | 14 | N | | 100 | 8 | 10 |
| Comparative Example 1.2 | 5 | 14 | 0 | 5 | N | | 100 | 22 | 21 |
| Embodiment 1.1 | 14 | 14 | 0 | 14 | N | N | 100 | 12 | 13 |
| Embodiment 1.2 | 14 | 13 | 0 | 14 | N | N | 100 | 15 | 16 |
| Embodiment 1.3 | 14 | 8 | 0 | 14 | N | N | 100 | 20 | 20 |
| Embodiment 1.4 | 10 | 8 | 0 | 10 | N | N | 100 | 13 | 11 |
| Embodiment 1.5 | 6 | 8 | 0 | 6 | N | N | 100 | 11 | 9 |
| Embodiment 1.6 | 4 | 8 | 0 | 4 | N | N | 100 | 10 | 8 |
| Embodiment 1.7 | 2 | 6 | 1.5 | 14 | N | N | 14.2 | 9 | 10 |
| Embodiment 1.8 | 2 | 6 | 2.5 | 14 | N | N | 14.2 | 10 | 11 |
| Embodiment 1.9 | 2 | 6 | 3.5 | 14 | N | N | 14.2 | 11 | 12 |
| Embodiment 1.10 | 2 | 6 | 2.5 | 14 | 200 | 5 | 14.2 | 6 | 10 |
| Embodiment 1.11 | 2 | 6 | 2.5 | 14 | 200 | 15 | 14.2 | 8 | 13 |
| Embodiment 1.12 | 2 | 6 | 2.5 | 14 | 800 | 5 | 14.2 | 5 | 6 |
| Embodiment 1.13 | 2 | 6 | 2.5 | 14 | 800 | 15 | 14.2 | 9 | 8 |

B) Tensile Strength of Adhesive Tape

The tensile strength of the adhesive tape is tested with reference to GB/T 30776-2014 standard.

Specifically, an adhesive tape with a length of 60 mm is placed on a tensile machine. The adhesive tape is clamped with clamps for 10 mm from the top and bottom respectively and stretched, while keeping 40 mm unclamped at the middle. The resulting tensile stress is the tensile strength of the adhesive tape.

First. Preparation of Adhesive Tape

Embodiment 1.7 is to prepare an adhesive tape with a thick region having a width of 2 mm.

Firstly, 10 kg of ethylene-propylene copolymer with a weight average molecular weight of 8W measured according to GB/T 36214.2-2018 is mixed with 10 L of toluene in a Second. Preparation of Secondary Battery Embodiment 1

1) Preparation of Positive Electrode Sheet (Attaching the Adhesive Tape Prepared in the Embodiment 1.1 to the Tab)

The positive electrode active material of lithium iron phosphate, the conductive agent of acetylene black and the binding agent of polyvinylidene fluoride (PVDF) are dissolved in the solvent of N-methyl pyrrolidone (NMP) at a weight ratio of 96.5:1.5:2, and are fully stirred and uniformly mixed to obtain positive electrode slurry. After that, the positive electrode slurry is coated uniformly on the positive electrode current collector, and is then dried, cold-pressed, and slit to obtain the positive electrode sheet.

The electrode sheet is cut by a die cutting machine to obtain a positive electrode tab with a height of 25 mm and a width of 45 mm. The adhesive tape prepared in the Embodiment 1.1 is then attached to the tab, ensuring that the thick region of the adhesive tape is attached to an active material region of a positive electrode sheet.

2) Preparation of Negative Electrode Sheet (Attaching the Adhesive Tape Prepared in the Embodiment 1.1 to the Tab)

The active material of artificial graphite, the conductive agent of acetylene black, the binding agent of styrene-butadiene rubber (SBR) and the thickening agent of sodium carboxymethyl cellulose (CMC) are dissolved in the solvent of deionized water at a weight ratio of 95:2:2:1 and uniformly mixed with the solvent of deionized water, to prepare negative electrode slurry. After that, the negative electrode slurry is coated uniformly on a copper foil of the negative electrode current collector, and is then dried to obtain a negative electrode film. The negative electrode film is then cold-pressed and slit to obtain a negative electrode sheet.

The die cutting machine is used to cut the electrode sheet to obtain a negative electrode tab with a height of 25 mm and a width of 45 mm. The adhesive tape prepared in the Embodiment 1.1 is then attached to the tab, ensuring that the thick region of the adhesive tape is attached to an active material region of the negative electrode sheet.

3) Isolation Film

A polyethylene film is used as the isolation film.

4) Preparation of Electrolyte 1M of $LiPF_6$ is dissolved in a solution composed of EC: EMC: DMC=1:1:1.

5) Preparation of Battery

The positive electron sheet, the isolation film and the negative electron sheet are stacked in sequence, such that the isolation film is arranged between the positive electron sheet and the negative electron sheet to isolate them. The positive electron sheet, the isolation film and the negative electron sheet are then wound to obtain an electrode assembly. The electrode assembly is then placed in a battery housing and dried, and after that, the electrolyte is injected in the battery housing and then processes such as chemical formation and standing are performed to obtain a lithium ion battery.

Preparation methods of the secondary batteries of the Embodiments 2-14 and the secondary battery of the Comparative Examples 1.1-1.2 are similar to that of the secondary battery in the Embodiment 1, but the adhesive tapes of the Embodiments 1.2-14 and the adhesive tapes of the Comparative Examples 1.1-1.2 are used. Different product parameters are listed in Table 1.

Comparative Example 2

A preparation method of the secondary battery is similar to that of the secondary battery of the Embodiment 1, but the tabs of the positive electrode and the negative electrode are not attached with the adhesive tape of the present disclosure.

Third. Testing Performance of Battery

1. Testing Failure Ratio of Short-Circuit of Battery Cell

An insulation resistance value is measured by an NS200 insulation resistance meter purchased from TEST. If the measured ohmic resistance is less than 10Ω, it is determined that a short circuit has occurred in the battery cell and the number of the short-circuited battery cells is counted. A value obtained by dividing the number of the short-circuited battery cells by the total number of the battery cells (N=50000) is used as the failure ratio.

2. Test of Interference Ratio

An assembled bare battery cell is installed into a housing. If the assembled bare battery cell cannot be normally placed into the housing and a top cover cannot be welded with the aluminum housing, it is determined to have interference, where interference ratio (%) n=A/B, A denotes the number of the battery cells that cannot be placed in the housing, and B denotes a total number of prepared battery cells.

Fourth. Test Results of Embodiments and Comparative Examples

The batteries in various Embodiments and Comparative Examples are prepared respectively according to the above methods, and various performance parameters are tested. The results are shown in Table 2 below.

TABLE 2

| Serial Number | Whether Top Cover is Installed Properly | Resulting Interference Ratio % | Failure Ratio of Safety Performance % |
|---|---|---|---|
| Comparative Example 1.1 | NO | 68% | 0.01% |
| Comparative Example1.2 | NO | 70% | 0.01% |
| Comparative Example 2 | YES | 0% | 2% |
| Embodiment 1 | NO | 72% | 0.01% |
| Embodiment 2 | NO | 75% | 0.01% |
| Embodiment 3 | NO | 78% | 0.01% |
| Embodiment 4 | NO | 70% | 0.01% |
| Embodiment 5 | NO | 65% | 0.01% |
| Embodiment 6 | NO | 61% | 0.01% |
| Embodiment 7 | NO | 10% | 0.001% |
| Embodiment 8 | YES | 14% | 0.001% |
| Embodiment 9 | YES | 16% | 0.001% |
| Embodiment 10 | YES | 0.2% | 0% |
| Embodiment 11 | YES | 0.5% | 0% |
| Embodiment 12 | YES | 0% | 0% |
| Embodiment 13 | YES | 0.2% | 0% |

The comparison of Embodiments 1-6 and Comparative Example 1 shows that all adhesive tapes are coated with a thick adhesive layer, and after an edge of the electrode sheet is attached with the adhesive tape, the interference ratio of the top cover is relatively high when the battery cell is put into the housing, which is not convenient for processing and manufacturing. The thicker the thickness of the adhesive layer is, the larger the interference ratio is.

The comparison of Embodiments 7-9 and Comparative Example 1 shows that when the adhesive layer of the adhesive tape is coated with a thin adhesive layer, after the edge of the electrode sheet is attached with the adhesive tape, the interference ratio of the top cover is relatively low when the battery cell is put into the housing. The thinner the adhesive layer is, and the lower the interference ratio is.

The comparison of Embodiments 10-13 and Embodiments 7-9 shows that if holes are formed in the adhesive tape, after the edge of the electrode sheet is attached with the adhesive tape, the interference ratio of the top cover is very low when the battery cell is put into the housing. When the formed holes have an aperture of 800 μm and a row spacing of 5 mm, the ratio is 0 and an optimal effect is achieved.

It can be seen from the Comparative Examples and the Embodiments that after the electrode sheet is attached with the adhesive tape, the failure ratio of the battery cell is reduced to 0. The attachment of the adhesive tape can provide excellent protection to improve the safety performance of the battery cell.

In addition, it can be seen from data in the Table 1 that if all adhesive layers are a thick adhesive layer, the wider the adhesive layer is, the larger the adhesive force is, and the greater the tensile strength is. When a thin adhesive layer is applied, the tensile strength is reduced. After holes are formed on the adhesive tape, the adhesive force and the tensile strength are both reduced, but the process and use requirements can be met.

It should be noted that the present disclosure is not limited to the above-mentioned embodiments. The above embodiments are merely examples, and embodiments having substantially the same composition as that of technical ideas and playing the same effect in the range of the technical solution of the present disclosure are all included in the technical scope of the present disclosure. In addition, without departing from the spirit of the present disclosure, various modifications which are applied to the embodiments and can be conceived by those skilled in the art, and other manners constructed by combining part of the components in the embodiments are also included within the scope of the present disclosure.

What is claimed is:

1. A secondary battery, comprising an adhesive tape and an electrode sheet having an electrode tab, the adhesive tape comprising a base-material layer and an adhesive layer,
- wherein the electrode sheet comprises a current collector, and the electrode tab is connected to at least one end of the current collector, wherein the adhesive layer comprises a thick region and a thin region which extend from a side edge of the adhesive tape in a width direction of the adhesive layer, the thick region is distributed along the side edge of the adhesive tape, and an adhesive layer thickness of the thick region is greater than an adhesive layer thickness of the thin region;
- wherein a ratio of an area of the thin region to an area of the thick region is 1:0.02-0.25,
- wherein the adhesive tape is attached on two sides of the electrode tab, the thick region of the adhesive tape is attached to the electrode sheet, the thin region covers an end face of the electrode tab, and adhesive portions of the adhesive tape on the two sides of the tab are attached to each other.

2. The secondary battery according to claim 1, wherein in the width direction of the adhesive layer, a width of the thick region is 1% to 20% of a width of the adhesive tape;
- the area of the thick region is 1% to 20% of a surface area of the adhesive tape; and
- the area of the thin region is 80% to 99% of the surface area of the adhesive tape.

3. The secondary battery adhesive tape according to claim 1, wherein the adhesive layer thickness of the thick region is 7 microns to 15 microns;
- the adhesive layer thickness of the thin region is 15% to 40% of the adhesive layer thickness of the thick region; and
- the width of the adhesive tape is 2 mm to 14 mm.

4. The secondary battery according to claim 1, wherein the adhesive tape is formed with through holes, the through holes are distributed in rows along a center line of the adhesive tape with a row spacing of 5 mm to 15 mm, and the through holes each have an diameter of 100 μm to 1000 μm.

5. The secondary battery according to claim 4, wherein the diameter of each of the through holes is from 200 μm to 1000 μm.

6. The secondary battery according to claim 5, wherein the diameter of each of the through holes is from 800 μm to 1000 μm.

7. The secondary battery according to claim 1, wherein an adhesive strength of the adhesive tape, tested with reference to GB/T 2792-2014 standard, is equal to or greater than 2N/m.

8. The secondary battery according to claim 1, wherein an average deviation of the adhesive layer thickness of the thick region, extending from the side edge of the adhesive tape in the width direction, does not exceed 10%, relative to an average adhesive layer thickness of the thick region.

9. The secondary battery according to claim 1, wherein the thick region, extending from the side edge of the adhesive tape in the width direction, has discontinuous protrusions distributed in a dotted pattern.

10. The secondary battery according to claim 1, wherein a color of the adhesive tape includes yellow, brown, green, blue, and white.

11. A battery module, comprising the secondary battery according to claim 1.

12. A battery pack, comprising the battery module according to claim 11.

13. A powered device, comprising at least one of the secondary battery according to claim 1, the battery module according to claim 11, or the battery pack according to claim 12.

* * * * *